United States Patent
McIntosh et al.

(10) Patent No.: US 7,429,292 B2
(45) Date of Patent: Sep. 30, 2008

(54) WATER WASHABLE LITHOGRAPHIC PRINTING INK

(75) Inventors: Sidney McIntosh, London (GB); Harold Bower, Welwyn Garden City (GB); Richard Durand, Jr., Oradell, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 210 days.

(21) Appl. No.: 11/454,590

(22) Filed: Jun. 16, 2006

(65) Prior Publication Data

US 2007/0289488 A1    Dec. 20, 2007

(51) Int. Cl.
    *C09D 11/02* (2006.01)
(52) U.S. Cl. ............... 106/31.6; 106/31.86; 106/31.75
(58) Field of Classification Search .......... 106/31.6, 106/31.86, 31.75
    See application file for complete search history.

(56) References Cited

U.S. PATENT DOCUMENTS

| | | |
|---|---|---|
| 3,356,030 A | 12/1967 | Greubel |
| 3,877,372 A | 4/1975 | Leeds et al. |
| 4,173,554 A | 11/1979 | Sulzberg |
| 4,278,467 A | 7/1981 | Fadner |
| 4,854,969 A | 8/1989 | Bassemir et al. |
| 4,954,556 A | 9/1990 | Bull et al. |
| 5,098,478 A | 3/1992 | Krishnan et al. |
| 5,370,906 A | 12/1994 | Dankert |
| 5,417,749 A | 5/1995 | Krishnan et al. |
| 5,725,646 A | 3/1998 | Krishnan et al. |
| 6,200,372 B1 * | 3/2001 | Krishnan et al. .......... 106/31.73 |
| 6,444,021 B1 | 9/2002 | Weisbecker et al. |
| 6,444,022 B1 | 9/2002 | Krishnan et al. |
| 6,709,503 B1 | 3/2004 | Krishnan et al. |
| 2002/0083865 A1 | 7/2002 | Krishnan et al. |

FOREIGN PATENT DOCUMENTS

DE        41 19 348        12/1992

* cited by examiner

*Primary Examiner*—Jerry Lorengo
*Assistant Examiner*—Veronica Faison Gee
(74) *Attorney, Agent, or Firm*—Kramer Levin Naftails & Frankel LLP

(57) ABSTRACT

Disclosed is a water washable ink for offset lithographic newspaper printing containing: a modified soybean oil-based resin; a pigment; and an acid neutralization agent, wherein the water washable offset lithographic newspaper printing ink does not contain any of the following: a humectant, a surfactant or a modified linseed oil.

14 Claims, No Drawings

WATER WASHABLE LITHOGRAPHIC PRINTING INK

FIELD OF THE INVENTION

The invention relates to water washable color newspaper printing inks.

BACKGROUND OF THE INVENTION

In an attempt to eliminate volatile organic compounds (VOCs) in the pressroom, water-based alternatives are being sought for ink formulations. Water-based printing inks for use in flexographic printing processes are known in the prior art. This type of printing process utilizes printing plates wherein the printing images stand up in relief, i.e. the areas to be printed are raised above the non-printing areas. Printing by the flexographic process requires relatively low pressure while sufficient pressure is applied to transfer the ink from the face of the image carrier to the surface of the substrate. Examples of useful water-based flexographic printing inks are disclosed in U.S. Pat. No. 4,173,554 and The Printing Ink Manual, edited by R. H. Leach and R. J. Pierce, pages 571-576, 5th edition, (Blueprint, 1993).

Water-based inks for gravure printing are also well known. In the gravure process, the printing image is engraved into a cylinder in the form of cells which become filled with ink. Printing is achieved by passing the substrate between the gravure cylinder and impression roller under pressure. Examples of useful water-based gravure printing inks are disclosed in U.S. Pat. Nos. 4,954,556 and 5,098,478.

The offset lithographic printing process presents a unique challenge to ink formulators since such process utilizes a planographic printing plate, i.e. the image and non-image areas are in the same plane on the image carrier, and two fluids are concurrently utilized.

It is fairly simple to define an image area by raising it above the background as in the case of the flexographic printing plate or lowering it as in the case of the gravure printing plate; avoidance of ink adhering to the non-image area is not too difficult to achieve. However, when all areas are on the same level, techniques must be utilized to insure that ink adheres only to the image area, and not to the non-image area.

In conventional offset lithographic printing processes, the plate is damped before it is inked with an oil-based ink. Typically, the damping process utilizes a fountain solution such as those described in U.S. Pat. Nos. 3,877,372, 4,278,467 and 4,854,969. Water will form a film on the hydrophilic areas (i.e. the non-image areas) of the printing plate, but will contract into tiny droplets on the oleophilic areas (i.e. the image areas). When an inked roller containing the oil-based ink is passed over the damped plate, it will be unable to ink the areas covered by the water film (the non-image areas), but will emulsify the droplets on the water-repellant areas (the image areas) and these will ink up. Such process is called offset lithography because the inked image on the plate does not directly print onto the paper substrate, but is first "offset" onto a rubber blanket, and transferred therefrom onto the paper substrate.

As mentioned above, conventional offset lithographic printing processes entails the use of oil-based inks and water-based fountain solutions. The ink/water balance is critical and is quite demanding of the pressman's skills. This issue is one of the several disadvantages associated with such printing processes as compared to flexographic and gravure printing processes. Moreover, the oil-based inks and aqueous fountain solutions typically employed in conventional offset lithographic printing processes contain fairly high levels of undesirable volatile organic compounds ("VOCs").

U.S. Pat. No. 3,356,030 discloses the use of a water-based printing ink in respect to a method of planographic printing utilizing a standard lithographic printing plate. However, the patented method also entails the use of a volatile hydrocarbon fountain solution which will coat the non-image areas and which is re-applied between successive printings. Of course, the use of a volatile hydrocarbon fountain solution undermines the principal purpose of the water-based ink compositions, i.e. the avoidance of the use of volatile organic compounds ("VOCs") during the printing process. Indeed, the water-washable ink compositions of the present invention are already low VOC offset lithographic printing inks which can be printed with any fountain solution whatsoever, and in addition will reduce the VOC further in the pressroom by eliminating the use of solvents during clean up.

In the 1980s, a resurgence of interest occurred in respect to "waterless" lithographic printing processes. Both positive and negative waterless planographic printing plates are commercially available from Toray Industries of Japan. The image area of a waterless planographic plate is a photopolymer similar to that employed for the image area of a conventional plate. However, the non-image area is coated with a polymer such as a silicone which is ink repellant. Further information about waterless printing plates and processes may be found in U.S. Pat. Nos. 5,370,906 and 5,417,749.

The waterless printing process solved two issues: VOCs emanating from the fountain solutions and control of the ink/water balance by the pressman. However, the difference in surface energy between the image and non-image areas of the conventional offset lithographic printing plate is typically 40 dynes/cm is dramatically reduced to 20 dynes/cm in the case of the waterless printing plate. Therefore the latitude between scumming and poor print density is considerably narrowed and the issue of VOCs (emanating from the oil-based ink) still remains in respect to waterless printing.

German Offenlegungsschrift DE 41 19 348 A1 pertains to a moistureless offset printing method and a water-based printing ink. The ink described therein is one which will adhere to hydrophilic materials, but not to hydrophobic materials, and contains a dye, water, 5-50% water-soluble macromolecular binder and a hygroscopic liquid, preferably a multihydric alcohol.

U.S. Pat. No. 5,725,646, which is incorporated herein by reference, describes a way of stabilizing a waterbased offset ink composition without drying up on a conventional multi roller ink train. Such composition eliminated the principal disadvantages of conventional offset lithographic printing inks, viz. high levels of VOCs emanating from the oil-based ink and the aqueous fountain solution and the difficulty in controlling the ink/water balance, while preserving the principal advantage of the conventional lithographic printing process, i.e. high surface energy differential between the image and non-image areas of the printing plate. It consists of using a rewetting agent, namely hydroxy ethyl ethylene urea. Since this rewetting agent does not dry, it remains in the final film making it susceptible to poor water resistance. Use of conventional rewetting agents, such as glycols and glycol ethers not only imparts poor water resistance to the final film, but also increases the tack of the formulations, thereby limiting its use on high speed presses.

U.S. Pat. No. 6,444,021, which is incorporated herein by reference, describes water washable color newspaper inks that contain a modified soybean oil-based resin, a pigment, an acid neutralization agent, and a humectant. This combination of ingredients causes the ink to readily disperse in water or aqueous detergent solutions that are commonly used for cleaning. The modified soybean oil-based resin provides the water washability when the oil is neutralized in the ink formulation providing the washable characteristics of water. These changes significantly expand coverage possible for newspaper inks.

U.S. Pat. No. 6,444,022, which is incorporated herein by reference, describes a water based lithographic ink comprising water; a modified rosin polymer comprised of resins soluble in water regardless of the pH of the water, resin rosin salts soluble in water at pH ranging from 7.5 to 10 and aqueous emulsion resins; a modified linseed oil; and pigment. This modified linseed oil comprises the reaction product of a polyglycol and linseed oil and provides an alternative to the use of hydroxyethyl ethylene urea which use has the disadvantage of slow drying and poor water resistance.

U.S. Patent Publication US 2002/0083865 which is incorporated herein by reference, describes a water based lithographic ink composition containing water, a resin-bonded pigment, a nonionic surfactant, a rewetting agent, and a polymerizable surfactant. This combination of ingredients allows the lithographic ink to dry rapidly at a rate comparable to oil-based inks, to emit minimal or no volatile organic compounds and to be water washable.

U.S. Pat. No. 6,709,503, which is incorporated herein by reference, describes a water based heatset offset lithographic ink containing water, polyamide resins or fumarated rosin resins, hydroxyethylene urea as a humectant, a modified linseed oil, a dibutylated benzoguanamine, a pigment and p-toluene sulfonic acid. This type of inks eliminates volatile organic compounds from the press room and the need for a humidity chamber in a manner which does not rely upon modified soybean oil based resin.

SUMMARY OF THE INVENTION

The present invention provides a water washable printing ink comprising:
(a) a modified soybean oil-based resin;
(b) a pigment; and
(c) an acid neutralization agent,
wherein said water washable offset lithographic printing ink does not contain any of the following: a humectant, a surfactant or a modified linseed oil.

Other objects and advantages of the present invention will become apparent from the following description and appended claims.

DETAILED DESCRIPTION OF THE INVENTION

It has now been surprisingly discovered that water washable lithographic printing ink, in particular lithographic newspaper printing ink, containing a modified soybean oil-based resin can be formulated to have good rheological properties in the absence of a humectant (i.e. a rewetting agent), a surfactant and a polyol modified linseed oil. This makes the preparation of the inks of the present invention more efficient and less costly. In addition, the removal of humectants such as hydroxyethyl ethylene urea from lithographic printing ink formulations allows for faster drying and better water resistance.

While most of the prior art low VOC inks, including those described above, are water based, the inks according to the present invention are water washable. The ink compositions according to the present invention have demonstrated unexpected results having demonstrated that they provide performance characteristics that had not been previously realized. Water washable as used herein means, regardless of whether the inks contain water, they contain a modified soybean oil-based resin with acid values preferably between 10 and 25 in addition to acid neutralizing agents. This combination of ingredients at the indicated percentages enables the ink to readily disperse in water or aqueous detergent solutions that presently are not commonly used for cleaning again yielding unexpected results, potentially eliminating the need for high voc cleaning agents. The resultant inks according to the present invention have been run at speeds up to 80,000 impressions per hour on standard newsprint grade paper on a commercial coldset press using waterless plates.

More specifically, it has been demonstrated that resins that are soluble regardless of pH as well as rosin resins can be eliminated in the water-washable ink formulation according to the present invention. It has also been demonstrated that water content may be from 0-10%, but preferably 0-5%, which is below the range of prior art water-based offset lithographic newspaper printing inks.

The discovery of a highly compatible soya resin system has yielded unexpected results, which now enable the formulation of a water-washable offset lithographic ink for newspaper printing that has low and stable tack and sustains runability. Once printed on the newspaper the ink has good rub resistance and a cost comparable to conventional oil-based newspaper inks.

The water-washable color newspaper inks according to the present invention comprise a modified soybean oil-based resin, a pigment and an acid neutralization agent. It has been discovered that this combination of ingredients at the indicated percentages enables the ink to readily disperse in water or aqueous detergent solutions that presently are not commonly used for cleaning. The modified soybean oil-based resin provides the water washability when the oil is neutralized in the ink formulation providing the washable characteristics of water. These changes significantly expand coverage possible for newspaper inks.

A water-washable color newspaper ink formula according to the present invention employs a modified soybean oil-based resin, which may comprise up to 5-25 wt. % of the ink composition. Embodiments of the modified soybean oil-based resin according to the present invention are selected from the group consisting of: alkali refined soybean oil, maleic anhydride, ethoxylated 1,2-ethanediol, polyethylene glycol (PEG), such as Carbowax 400, PEG-6 methyl ether, such as Carbowax 350; and hydrated monobutyltin oxide, such as Fascat 4100. Normal soybean oil may be used to adjust physical properties as desired.

The pigment according to the present invention may be any of those which are suitable for formulating offset lithographic printing inks such as CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26. The pigment according to the present invention may be in the range of 5-30 wt. %, and preferably in the range of 10-20 wt. %.

In embodiments according to the present invention suitable acid neutralization agents are selected from the group consisting of the alkanolamines, alkyl substituted alkanolamines, ethanolamines and subsituted alkylolamines in the amount of from about 0.5-about 3.5 wt %. Examples of alkanolamines include and are not limited to monoethanolamine, diethanolamine, triethanolamine, isopropanol amine, diisopropanolamine and triisopropanolamine. Examples of alkyl substituted alkanolamines include and are not limited to N,N-dimethylethanolamine, N-methyldiethanolamine, N-methylethanolamine and N,N-diethylethanolamine.

In the water-washable newspaper printing ink of the present invention the water may be present in amounts of 0 to 10 wt. %; and more preferably 0 to 5 wt. %. Prior art lithographic news inks typically included a macromolecular resin binder in amounts of 10 to 70 wt. %; and more preferably 30 to 60 wt. %; and most preferably the macromolecular resin binder is a composite having up to 5 wt. % of a resin binder soluble in water regardless of the pH of the water; 10 to 70 wt. % of a resin binder soluble in water at a pH ranging lo- from 7.5 to 10; and up to 20 wt. % of an aqueous emulsion resin binder. In the waterless offset lithographic news ink according to the present invention, the binder resin content soluble in water has been reduced to zero (0) which enhances deinkability.

The waterless news ink of the present invention are further illustrated by the following non-limiting examples in which all parts and percentages are by weight, unless otherwise indicated.

EXAMPLE 1

Preparation of Lithographic Printing Inks #1-4

Offset lithographic newspaper printing inks #1-4 were prepared containing the ingredients listed in Table 1 below. All materials were combined in sequence using a high speed mixer then fully dispersed by bead, shot mill or three roll mill.

TABLE 1

List of Ingredients for Inks #1-4.

| Ingredient | Ink #1 | Ink #2 | Ink #3 | Ink #4 |
|---|---|---|---|---|
| R2525-18 Original Modified Soya | 15.0 | 15.0 | 15.0 | 15.0 |
| Alkanolamines Acid neutralization agent | 2.0 | 2.0 | 2.0 | 2.0 |
| Antioxidant | 0.5 | 0.5 | 0.5 | 0.5 |
| 370 Cst Heavy Oil | 4.0 | 4.0 | 4.0 | 4.0 |
| Gel varnish | 52.0 | 52.0 | 52.0 | 52.0 |
| Pigment Yellow 12 Pigment | 14.0 | — | — | — |
| Pigment PR 57:1 Pigment | — | 14.0 | — | — |
| Pigment Blue 53:1 Pigment | — | — | 14.0 | — |
| Carbon Pigment | — | — | — | 14.0 |
| Clay powder | 3.0 | 3.0 | 3.0 | 3.0 |
| 12.4 Cst Light oil | 9.5 | 9.5 | 9.5 | 9.5 |
| Total | 100 | 100 | 100 | 100 |

EXAMPLE 2

Testing of Lithographic Printing Inks #1-4

Tests conducted on Offset lithographic newspaper printing inks #1-4 from Example 1 show that the inks run satisfactorily on the press, give good quality prints, and can be washed up with water or aqueous detergents.

Briefly, each of Inks #1-4 was run on a Cortina KBA printing press. The printing plate, obtained from Toray Industries, had an aluminum substrate coated with a photopolymer whose surface was oleophilic in nature; the non-image area was coated with an oleophobic silicone elastomer. The press run was carried out at a press speed of 80,000 cph with printing onto Stora Enso 45 gsm. newsprint stock. Samples obtained from the press run exhibited sharp, well defined, dry images of excellent print quality. The non-image area exhibited negligible toning, and the image area achieved a print density of about 0.89, measured with a densitometer.

The invention has been described in terms of preferred embodiments thereof, but is more broadly applicable as will be understood by those skilled in the art. The scope of the invention is only limited by the following claims.

What is claimed is:

1. A water washable printing ink comprising:
   (a) a modified soybean oil-based resin;
   (b) a pigment; and
   (c) an acid neutralization agent,
wherein said water washable printing ink does not contain a humectant, a surfactant and a modified linseed oil.

2. The ink of claim 1, wherein the amount of modified soybean oil bases resin present is from about 5 to about 25 wt. %.

3. The ink of claim 2, wherein the modified soybean oil based resin is selected from the group consisting of an alkali refined soybean oil, a maleic anhydride, a polyethylene glycol (PEG), and a hydrated monobutyltin oxide.

4. The ink of claim 2, wherein the modified soybean oil based resin comprises an alkali refined soybean oil, a maleic anhydride, a methyl ether or a polyethylene glycol (PEG) having an average molecular weight of about 600 (PEG-6), and a hydrated monobutyltin oxide.

5. The ink of claim 1, wherein the pigment is present in an amount from about 5 to about 30 wt. %.

6. The ink of claim 1, wherein the pigment is present in an amount from about 10 to about 20 wt. %.

7. The ink of claim 1, wherein the pigment is selected from the group consisting of CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29 56 and 61; CI Pigment Violets 3, 23 and 37; CI Pigment Blacks 6 and 7; and CI Pigment Whites 6, 7, 18 and 26.

8. The ink of claim 1, wherein the amount of acid neutralization agent is present in an amount from about 0.5 to about 3.5 wt. %.

9. The ink of claim 1, wherein the acid neutralization agent is selected from the group consisting of: ethanolamines and substituted alkylolamines.

10. The ink of claim 1, wherein the acid neutralization agent is selected from the group consisting of alkanolamines and alkyl substituted alkanolamines.

11. The ink of claim 10, wherein said alkanolamines are selected from the group consisting of monoethanolamine, diethanolamine, triethanolamine, isopropanolamine, diisopropanolamine and triisopropanolamine.

12. The ink of claim 10, wherein said alkyl substituted alkanolamines are selected from the group consisting of N,N-dimethylethanolamine, N-methyldiethanolamine, N-methylethanolamine and N,N-diethylethanolamine.

13. The ink of claim 1, further comprising water.

14. The ink of claim 13, wherein the water is present in an amount from about 0 to about 10 wt. %.

* * * * *